United States Patent [19]
Christensen

[11] Patent Number: 6,039,273
[45] Date of Patent: Mar. 21, 2000

[54] CORNER PIVOT IRRIGATION MACHINE

[75] Inventor: Dale A. Christensen, Arlington, Nebr.

[73] Assignee: Valmont Industries, Inc., Valley, Nebr.

[21] Appl. No.: 09/217,658

[22] Filed: Dec. 21, 1998

[51] Int. Cl.[7] ........................................ B05B 3/12
[52] U.S. Cl. ................... 239/729; 239/735; 239/739; 239/744; 239/DIG. 1
[58] Field of Search ............................ 239/726, 728–733, 239/735, 739, 744, DIG. 1; 180/168, 401

[56] References Cited

U.S. PATENT DOCUMENTS

| | | | |
|---|---|---|---|
| 3,628,729 | 12/1971 | Thomas | 239/729 |
| 3,902,668 | 9/1975 | Daugherty et al. | 239/177 |
| 3,979,062 | 9/1976 | Christensen et al. | 239/729 X |
| 4,161,292 | 7/1979 | Holloway et al. | 239/11 |
| 4,227,648 | 10/1980 | Holloway et al. | 239/11 |
| 4,340,183 | 7/1982 | Kegel et al. | 239/DIG. 1 X |
| 4,569,481 | 2/1986 | Davis et al. | 239/729 |
| 4,664,316 | 5/1987 | Purtell et al. | 239/744 X |
| 4,674,681 | 6/1987 | Meis et al. | 239/739 X |
| 4,729,514 | 3/1988 | Ostrom et al. | 239/727 |
| 5,435,495 | 7/1995 | Davis | 239/728 |
| 5,678,771 | 10/1997 | Chapman | 239/727 |

*Primary Examiner*—Andres Kashnikow
*Assistant Examiner*—Steven J. Ganey
*Attorney, Agent, or Firm*—Zarley, McKee, Thomte Voorhees & Sease; Dennis L. Thomte

[57] ABSTRACT

A corner pivot irrigation machine comprising a main arm extending outwardly from a center pivot structure supported upon and driven by a plurality of non-steerable drive towers. An elongated corner arm is pivotally secured to the outer end of the main arm and is supported by a steerable drive tower including an elongated beam positioned beneath the water line of the corner arm and having a pair of drive wheel supports positioned at the opposite ends thereof which are rotatable with respect thereto about vertical axes. A steering motor, driven by a conventional guidance system, is mounted on the main beam and is connected to the rotatable drive wheel supports by an adjustable linkage to enable the linkage to be selectively adjusted when the machine is to be operated in a reverse direction.

2 Claims, 5 Drawing Sheets

CORNER PIVOT IRRIGATION MACHINE

BACKGROUND OF THE INVENTION

1. Field of the Invention

This invention relates to a corner pivot irrigation machine and more particularly to a corner pivot irrigation machine having means thereon for selectively adjusting the steering linkage between the steering motor and the drive wheel supports to enable the machine to be operated in a reverse direction.

2. Description of the Related Art

In most corner pivot irrigation machines, the machine comprises an elongated main arm or span extending outwardly from a center pivot structure and having a corner arm or span pivotally connected to the outer end thereof. The main arm comprises a series of water pipes secured together in an end-to-end relationship to form a water pipeline which is supported upon a plurality of non-steerable drive towers. The corner arm or span comprises one or more water pipes supported upon a steerable drive tower. The steerable drive tower includes a pair of steerable drive wheels which are driven and steered to move the corner arm out into the corners of a field as the main arm approaches the corners and to retract the corner arm as the main arm departs the corners of the field. Usually, the corner pivot irrigation machine is operated in a forwardly direction, that is, with the main arm leading the corner arm. However, in some situations, it is desirable or necessary to have the corner arm leading the main arm. The steerable drive tower of the corner arm normally includes an elongated main beam which is positioned beneath the corner arm waterline and which is secured thereto by a truss-like supporting structure. The corner arm main beam normally has a steering motor mounted thereon which has an elongated link or arm extending therefrom which is connected to a linkage which in turn is connected to the pivotal drive wheel supports positioned at the outer ends of the main beam upon which are mounted the steerable drive wheels. The steering motor is activated by a guidance system, such as a buried wire guidance system, to pivotally move or rotate the drive wheel supports with respect to the main beam on the steerable drive tower so that the corner arm is extended and retracted with respect to the main arm in conventional fashion.

As stated, in most corner pivot irrigation machines, the machine is operated in a forwardly direction, that is, with the corner arm trailing the main arm. In order to facilitate the movement of the steerable drive tower, with the drive wheels on the steerable drive tower following one another to create a single wheel track, the main beam on the steerable drive tower is angled with respect to the longitudinal axis of the corner span approximately 20°. That is, the angle between the leading portion of the main beam and the corner water line is 70°. Although the angular relationship of the main beam with the corner span works very well when the machine is being operated in a forward direction, the angular relationship of the main beam and the corner span creates a problem when the machine is being operated in a reverse direction. The problem that arises in the operation of the machine described above in a reverse direction is that the linkage connecting the steering motor and the drive wheel supports cannot be moved sufficiently to properly position the steerable drive wheels to enable the steerable drive wheels of the steerable drive tower to lead the machine. Accordingly, for the corner pivot machine to be converted so that it may be operated in a reverse direction, the linkage connecting the steering motor and the drive wheels supports, as well as the main beam, must be drastically modified or completely replaced, since the existing linkage cannot adequately pivot the drive wheel supports to enable the corner arm to lead the main arm in the reverse direction.

A further problem associated with the angular relationship of the main beam with respect to the corner span is that the angular relationship makes it difficult to fully extend the corner arm to a position whereby it is in substantial alignment with the main arm.

SUMMARY OF THE INVENTION

A corner pivot irrigation machine is disclosed comprising a main arm extending outwardly from a center pivot structure with the main arm being supported upon and driven by a plurality of non-steerable drive towers. A corner arm is pivotally secured to the outer end of the main arm and is supported by a steerable drive tower. The steerable drive tower includes an elongated main beam positioned beneath the water line of the corner arm and which is operatively secured thereto. Rotatable drive wheel supports are positioned at each end of the main beam and are rotatable with respect thereto about vertical axes. A steering motor is secured to the main beam and has a rotatable drive shaft extending vertically therefrom which has an elongated first link arm secured to the drive shaft and which extends horizontally outwardly therefrom. An elongated second link arm is secured at one end to one of the drive wheel supports and extends outwardly therefrom. An elongated third link arm is secured at one end to the other of the drive wheel supports and also extends outwardly therefrom. An elongated linkage is pivotally secured to and extends between the other ends of the second and third link arms. The other end of the first link arm is pivotally secured to the elongated linkage whereby rotation of the drive wheel shaft of the steering motor causes the drive wheel supports to be pivotally moved with respect to the main beam. The connection of the second and third link arms with the drive wheel supports is adjustable, about a vertical axis, so that adjustment may be made therebetween to enable the machine to be operated in either a forward or rearward direction. The adjustment is easily made and does not require modification or replacement of the components of the system. In the corner pivot irrigation machine of this invention, the main beam is disposed at a right angle with respect to the water line of the corner span which aids in fully extending the corner arm to a position wherein it is in substantial alignment with the main arm.

It is therefore a principal object of the invention to provide an improved corner pivot irrigation machine. Yet another object of the invention is to provide a corner pivot irrigation machine wherein the main beam of the corner arm is disposed at right angles to the length of the corner arm to enable the corner arm to be fully extended into alignment with the main arm.

Yet another object of the invention is to provide a corner pivot irrigation machine wherein means is provided for adjustably connecting the steering motor to the drive wheel supports on the steerable drive tower so that the machine may be operated in a rearward fashion without extensive replacement or modification of the steering mechanism on the steerable drive tower.

These and other objects will be apparent to those skilled in the art.

DESCRIPTION OF THE PREFERRED EMBODIMENT

Figure 1:
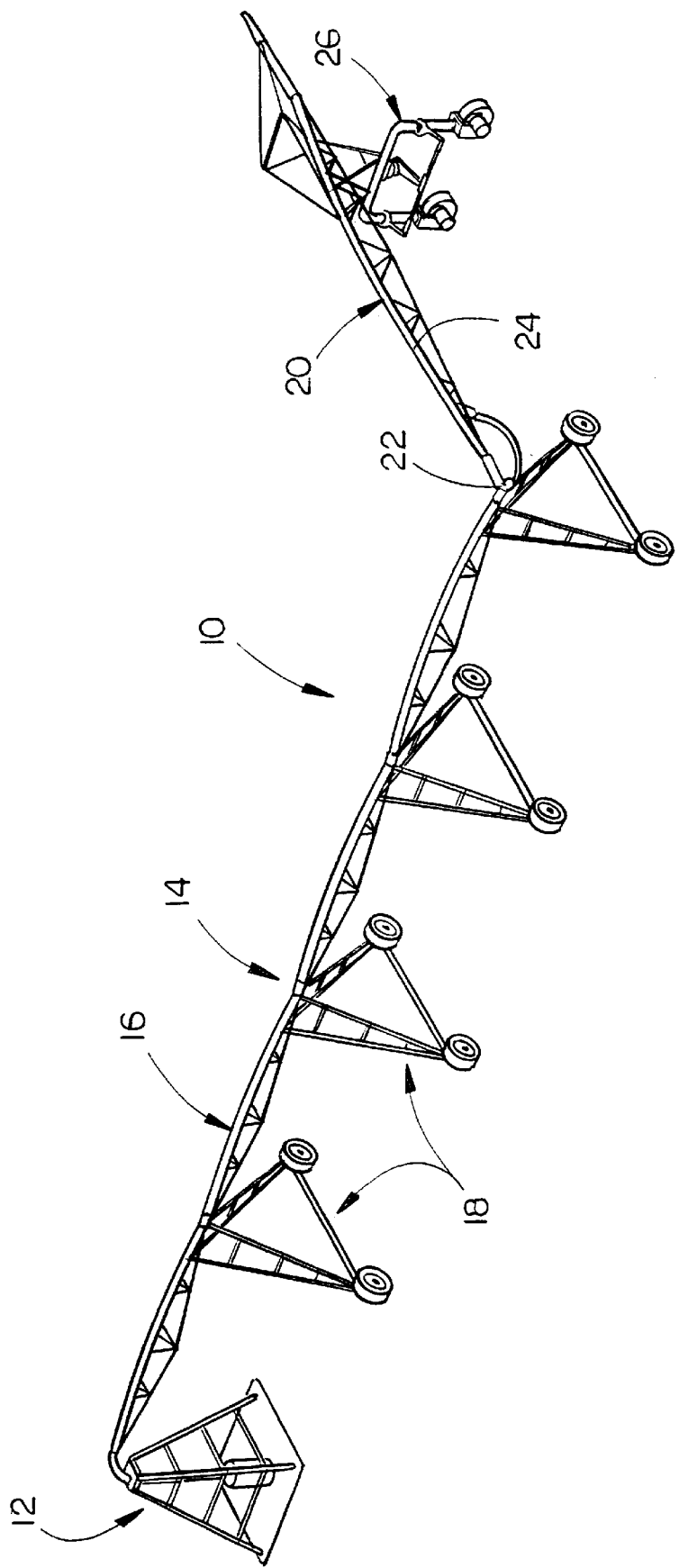
FIG. 1 is a perspective view of a corner pivot irrigation machine of this invention.

The numeral 10 refers to a corner pivot irrigation machine which is conventional in design except for the means for adjusting the steering linkage of the steerable drive tower of the machine, as will be described hereinafter, and except that the main beam of the steerable drive tower is disposed at a right angle with respect to the corner arm waterline. Machine 10 includes a center pivot structure 12 having a main arm extending outwardly therefrom. Main arm 14 comprises a water conduit or pipeline 16 supported upon a plurality of non-steerable drive towers 18. Corner arm 20 is pivotally connected to the outer end of main arm 14 at 22 in conventional fashion and comprises and a water conduit or pipe 24 which is supported upon a steerable drive tower 26.

Figure 2:
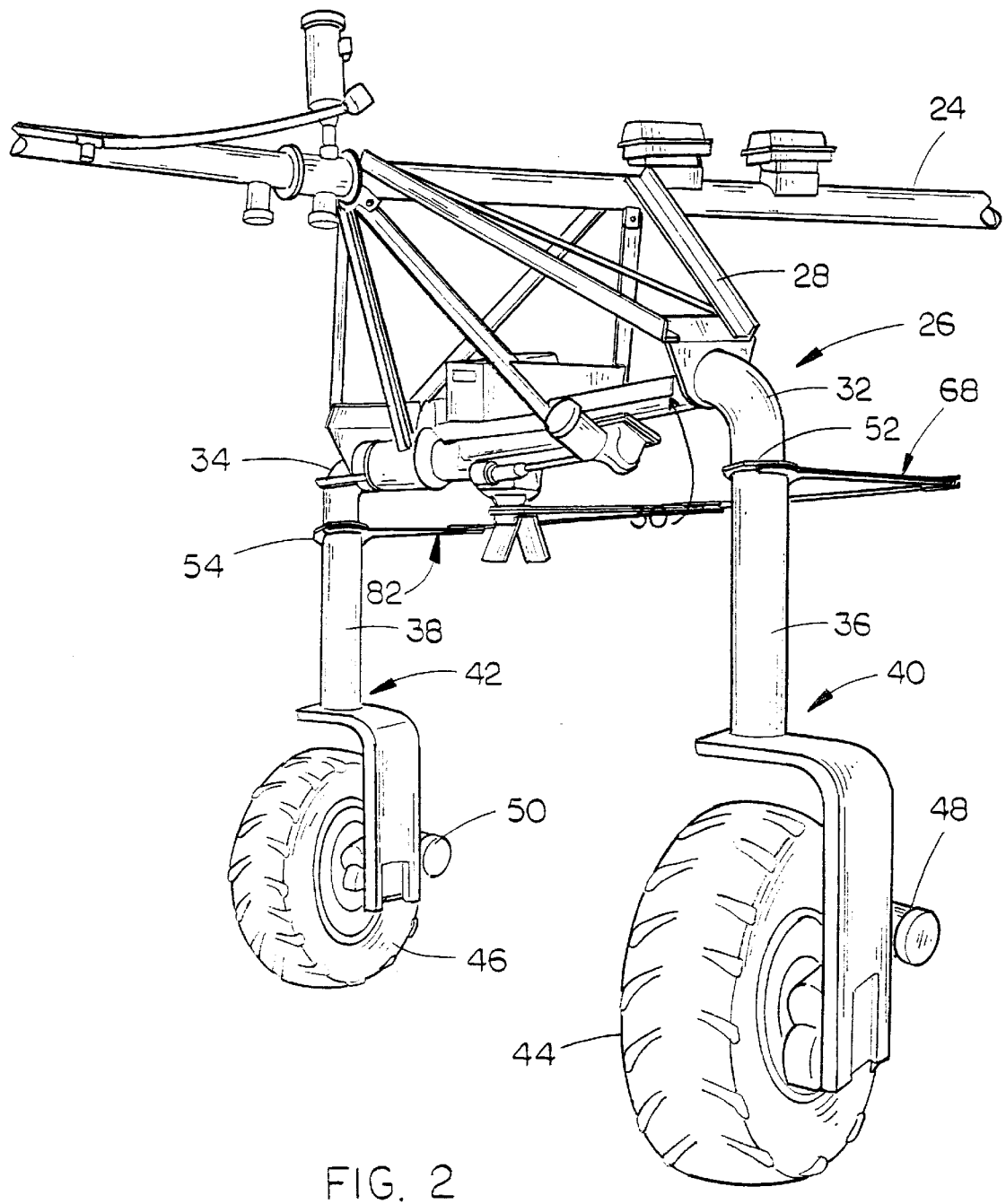
FIG. 2 is a perspective view of the steerable drive tower of this invention.

As seen in FIG. 2, the steerable drive tower 26 includes a truss 28 which connects the drive tower 26 to the pipe 24. Drive tower 26 includes a main beam 30 having opposite ends. In this invention, the beam 30 is disposed at right angles to the longitudinal axis of the pipe 24 rather than being disposed at an angle with respect thereto as is common in most corner pivot irrigation machines. A pair of tubular supports 32 and 34 are secured to the opposite ends of main beam 30 with the lower ends thereof rotatably receiving the vertically disposed tubes 36 and 38 of drive wheel supports 40 and 42, respectively. Drive wheels 44 and 46 are rotatably mounted on the lower ends of the drive wheel supports 40 and 42, respectively, and are driven by means of electric motors 48 and 50 in conventional fashion. As seen in the drawings, the upper ends of the tubes 36 and 38 have outwardly extending flanges 52 and 54 provided thereon. Each of the flanges 52 and 54 have a plurality of spaced-apart openings 56 formed therein.

A conventional steering motor 58 is secured to the underside of main beam 30 and has a rotatable drive shaft 60 extending vertically downwardly therefrom. A guidance means, such as a buried wire guidance system, is utilized for the operation of the steering motor 58 to control the steering of the wheels 44 and 46. The wheels 44 and 46 are driven by means of a conventional actuation means normally located at the joint between the main arm and the corner arm.

Figure 4:
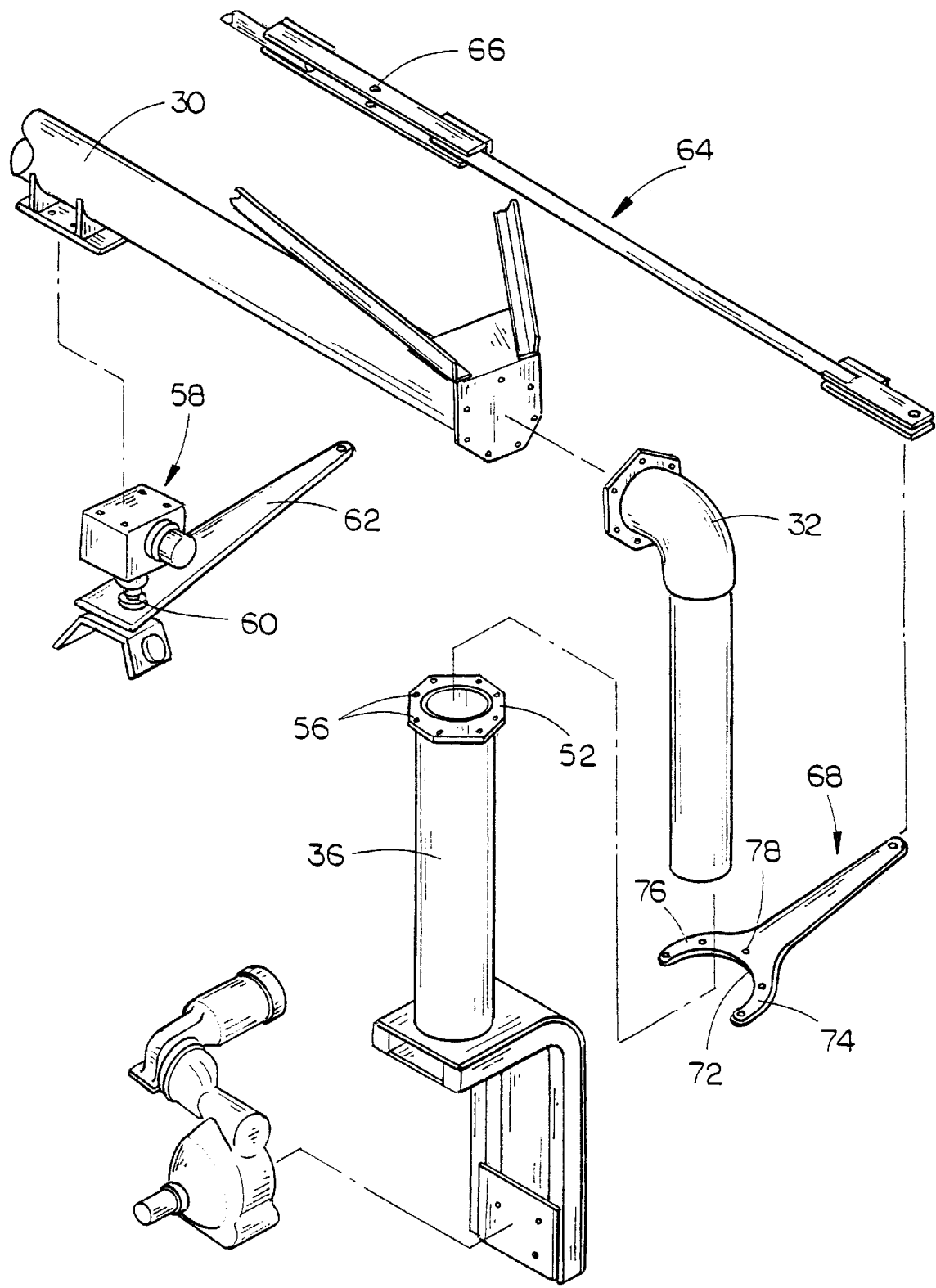
FIG. 4 is an exploded perspective view of a portion of the steerable drive tower of this invention.
Figure 5:
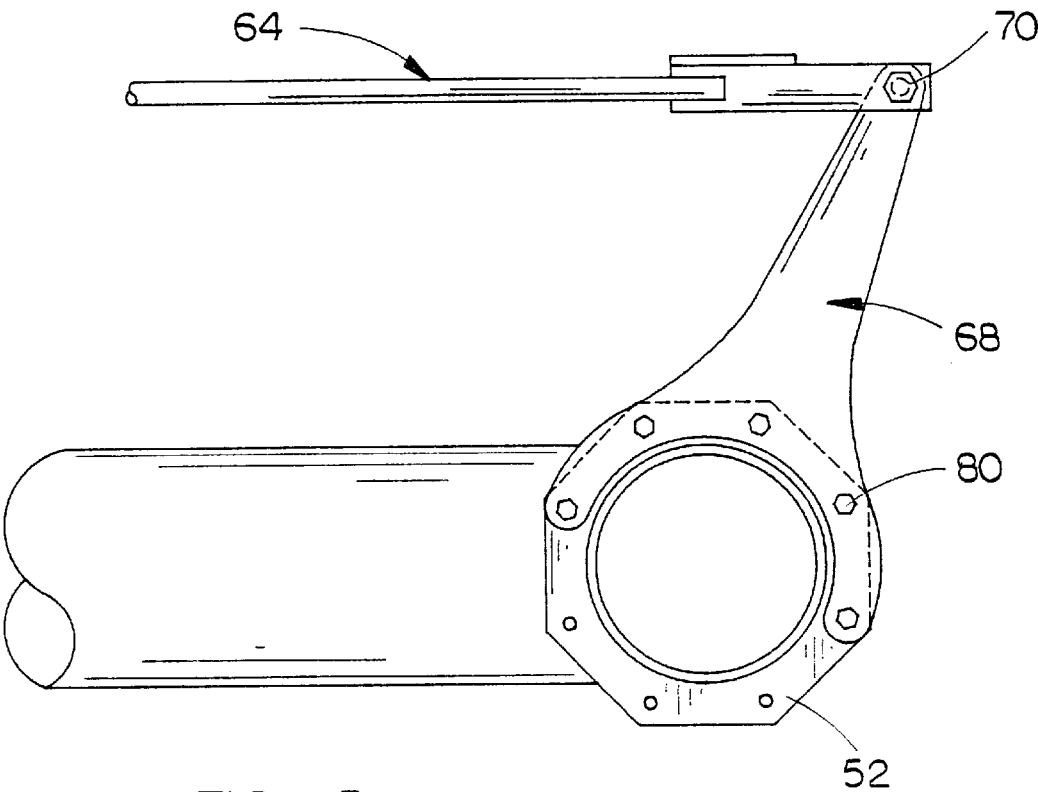
FIG. 5 is a partial top elevational view of a portion of the adjustable linkage.
Figure 6:
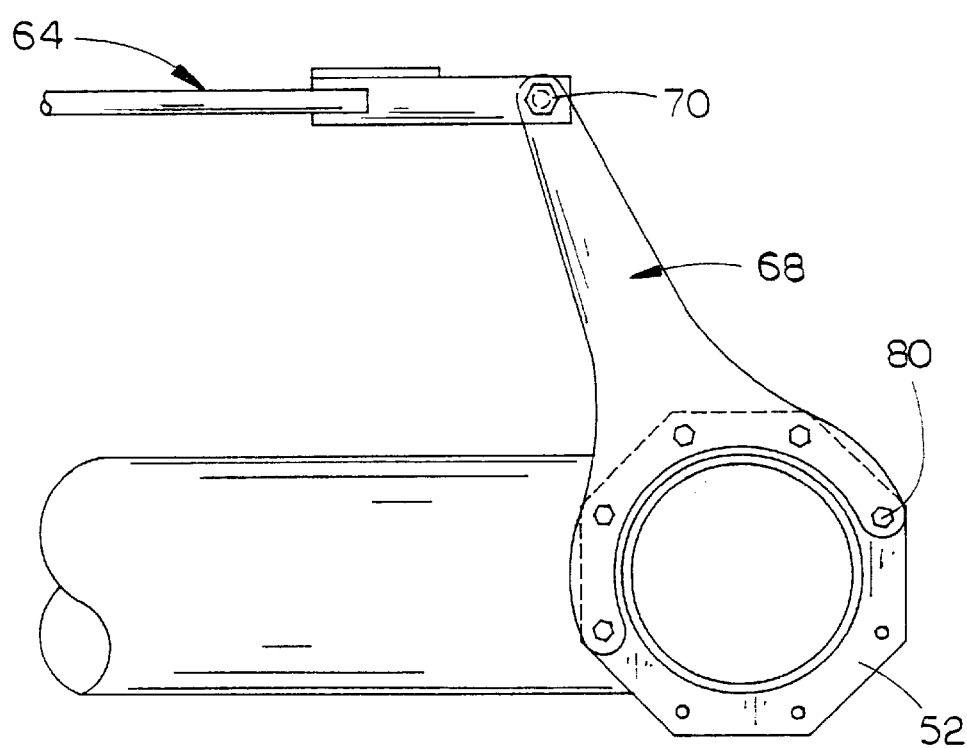
FIG. 6 is a view similar to FIG. 5 except that the linkage has been adjusted with respect to the drive wheel support.

A first link arm 62 is secured at one end to the shaft 60 for rotation therewith and extends horizontally outwardly therefrom. The outer end of the first link arm 62 is pivotally connected to a linkage 64 at 66 by a bolt or pin. A second link arm 68 has its outer end pivotally connected to one end of linkage 64 by means of a bolt or pin 70, as illustrated in FIG. 5. The inner end of the link arm 68 is provided with a semi-circular recess 72 formed therein which defines end portion 74 and 76. A plurality of spaced-apart openings 78 are formed in the link arm 68, as illustrated in FIG. 4.

The semi-circular opening 72 receives and partially embraces the support 36 above flange 52 with the link arm 68 being secured to the flange 52 by means of bolts 80, as illustrated in FIG. 5. Link arm 82, which is identical to link arm 68, has one end connected to the flange 54 and has its other end connected to the other end of the linkage 64. The link arm 82 is connected to the flange 54 in an identical manner as link arm 68 is secured to flange 52.

Thus, when the machine is being operated in a forward direction, the link arms 68 and 82 will be secured to the flanges 52 and 54, respectively, with the bolts connecting the same extending through certain of the openings in the inner end of the link arm and the openings in the flange. When the machine is to be operated in a reverse direction, the angular relationship between link arm 68 and flange 52 and the relationship between link arm 82 and flange 54 is easily changed by removing the bolts connecting the same and by rotating the link arms 68 and 82 with respect to the flanges 52 and 54, respectively, and then re-inserting the connecting bolts in a different set of openings so that the steering wheel supports 40 and 42 may be sufficiently pivotally moved with respect to the main beam so that the drive wheels 44 and 46 may be moved to the proper position by the steering motor in the reverse direction. The means of this invention converting the linkage between the steering motor and the drive wheels is quickly and easily accomplished without any extensive modification of the machine or a replacement of component parts.

Figure 3:
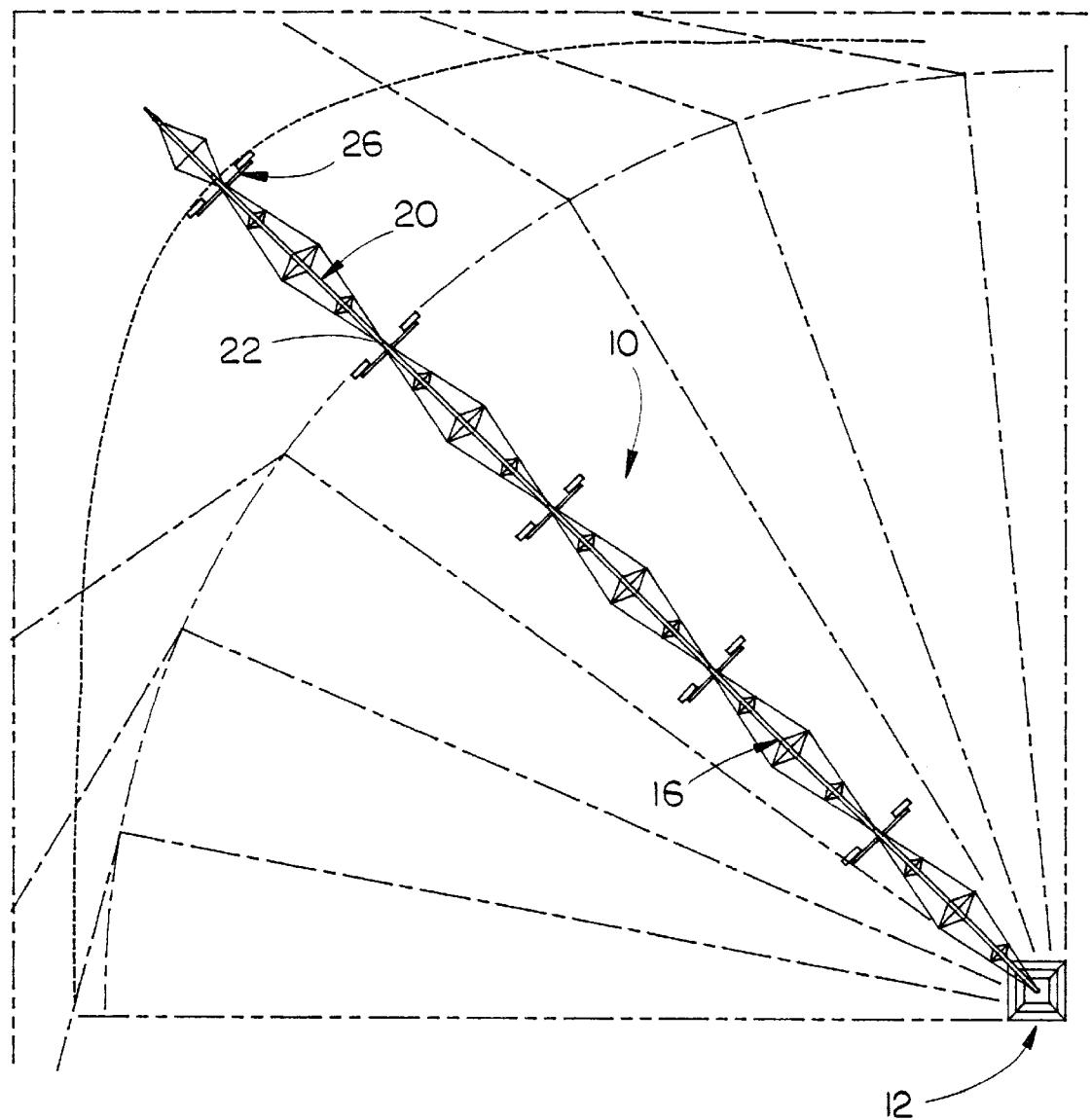
FIG. 3 is a schematic view illustrating the manner in which the corner arm of this invention may be fully extended to a position in substantial alignment with the main arm.

Although the drive tower of the corner arm does create a pair of wheel tracks in the field rather than a single wheel track, the advantage of being able to fully extend the corner arm into alignment with the main arm, as illustrated in FIG. 3, and the ability of the machine to be quickly adjusted so as to be able to be driven in a rearward manner greatly overcomes any disadvantage associated with a pair of wheel tracks rather than a single wheel track.

Thus it can be seen that the invention accomplishes at least all of its stated objectives.

I claim:

1. In combination:

a corner pivot irrigation machine comprising a center pivot structure, a main arm extending outwardly from said center pivot structure supported upon and driven in either a forwardly or rearwardly direction by a plurality of non-steerable drive towers; an elongated corner arm pivotally secured to the outer end of said main arm and supported by a steerable drive tower;

said steerable drive tower comprising:

(a) an elongated main beam positioned beneath said corner arm and operatively connected thereto, said mean beam having opposite ends;

(b) a drive wheel support positioned at each end of said main beam and being rotatable with respect thereto about vertical axes;

(c) a drive wheel mounted on each of said drive wheel supports;

(d) a steering motor secured to said main beam and having a rotatable drive shaft extending vertically therefrom;

(e) an elongated first link arm, having opposite ends, having one end secured to said drive shaft and extending horizontally outwardly therefrom;

(f) an elongated second link arm, having opposite ends, secured at one end to one of said drive wheel supports and extending outwardly therefrom;

(g) an elongated third link arm, having opposite ends, secured at one end to the other of said drive wheel supports and extending outwardly therefrom;

(h) and an elongated linkage pivotally secured to and extending between the other ends of said second and third link arms;

(i) the other end of said first link arm being pivotally secured at said elongated linkage whereby rotation of said drive shaft of said steering motor causes said drive wheel supports to be pivotally moved;

(j) the said one end of each of said second and third link arms being selectively adjustably secured, about a vertical axis, to the said drive wheel supports.

2. The combination of claim 1 wherein each of said drive wheel supports includes a horizontally disposed, disc-shaped flange secured thereto; each of said flanges having a plurality of spaced-apart bolt openings formed therein; said one end of each of said second and third link arms having a semi-circular recess formed therein which defines a yoke portion for positioning on and attachment of said inner end thereof to the respective flange; said yoke portions having a plurality of spaced-apart bolt openings formed therein which register with said openings in said flanges; and bolts extending through said bolt openings in said flanges and said yoke portions for selectively adjustably securing said second and third link arms to said first and second drive wheel supports, respectively.

* * * * *